US006549907B1

(12) United States Patent
Fayyad et al.

(10) Patent No.: US 6,549,907 B1
(45) Date of Patent: Apr. 15, 2003

(54) MULTI-DIMENSIONAL DATABASE AND DATA CUBE COMPRESSION FOR AGGREGATE QUERY SUPPORT ON NUMERIC DIMENSIONS

(75) Inventors: Usama Fayyad, Mercer Island, WA (US); Jayavel Shanmugasundaram, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/296,831

(22) Filed: Apr. 22, 1999

(51) Int. Cl.[7] .............................................. G06F 17/30
(52) U.S. Cl. ...................... 707/101; 707/3; 707/200; 707/205
(58) Field of Search ................................. 707/3–6, 205, 707/101, 200

(56) References Cited

U.S. PATENT DOCUMENTS

| | | | | | |
|---|---|---|---|---|---|
| 5,799,300 | A | * | 8/1998 | Agrawal et al. ................. | 707/5 |
| 6,012,058 | A | * | 1/2000 | Fayyad et al. .................. | 707/6 |
| 6,044,366 | A | * | 3/2000 | Graffe et al. .................... | 707/2 |
| 6,049,797 | A | * | 4/2000 | Guha et al. ...................... | 707/6 |
| 6,115,708 | A | * | 9/2000 | Fayyad et al. .................. | 707/3 |
| 6,263,337 | B1 | * | 7/2001 | Fayyad et al. .................. | 707/6 |
| 6,374,251 | B1 | * | 4/2002 | Fayyad et al. ............... | 707/101 |

OTHER PUBLICATIONS

Bradley et al.; Scaling Clustering Algoritms to Large Databases; Proc. 4th Intl. Conf. On Knowledge Discovery & Data Mining; 1998.*
C. M. Bishop. "Neutral Networks for Pattern Recognition". Bayes Theorem. Clarendon Press.Oxford pp. 17–23 (1995).
C.M. Bishop. "Neural Networks For Pattern Recognition." The Normal Distribution. Clarendon Press.Oxford. pp. 34–38 (1995).
C.M. Bishop. "Neural Networks For Pattern Recognition." Maximum Likihood. Clarendon Press. Oxford pp. 39–42 (1995).
C.M. Bishop. "Neural Networks For Pattern Recognition." Density Estimation in General. Clarendon Press. Oxford pp. 51–55 (1995).
C. M. Bishop. "Neural Networks for Pattern Recognition." Mixture Models/Maximum Likelihood/EM Algorithm. Clarendon Press.Oxford pp. 59–72 (1995).

(List continued on next page.)

*Primary Examiner*—Jean M. Corrielus
*Assistant Examiner*—Jean Bolte Fleurantin
(74) *Attorney, Agent, or Firm*—Watts, Hoffmann, Fisher & Heinke, Co., LPA

(57) ABSTRACT

An apparatus and method for efficiently compressing contents of a database system to support ad hoc querying and OLAP type aggregation queries. This invention consists of a new compressed representation of the data cube that (a) drastically reduces storage requirements, (b) does not require the discretization hierarchy along each query dimension to be fixed beforehand and (c) treats each dimension as a potential target measure and supports multiple aggregation functions without additional storage costs. The tradeoff is approximate, yet relatively accurate, answers to queries. We outline mechanisms to reduce the error in the approximation. Our performance evaluation indicates that our compression technique effectively addresses the limitation of existing approaches. The basic method relies on representing the contents of the database by a probability distribution consisting of a mixture of Gaussians. Aggregation queries, be they multi-dimensional, conjunctive, or disjunctive, can be answered by performing integration over the probability distribution.

38 Claims, 5 Drawing Sheets

OTHER PUBLICATIONS

R. Duda and P. Hart. "Pattern Classification and Scene Analysis." *Bayes Decision Theory*. John Wiley & Sons pp. 10–13 (1973).

R. Duda and P. Hart. "Pattern Classification and Scene Analysis. " *The Normal Density*. John Wiley & Sons. pp. 22–24 (1973).

R. Duda and P. Hart. "Pattern Classification and Scene Analysis." *Maximum Likelihood Estimation*: John Wiley & Sons pp. 45–49 (1973).

R. Duda and P. Hart. "Pattern Classificationa nd Scene Analysis." *Sufficient Statistics and The Exponential Family.* pp. 62–66 John Wiley & Sons (1973).

R. Duda and P. Hart. "Pattern Classification and Scene Analysis." *Density Estimation*. John Wiley & Sons Chap. 4, pp. 85–88 (1973).

R. Duda and P. Hart. "Pattern Classification and Scene Analysis." *Unsupervised Learning and Clustering*. John Wiley & Sons. Chap. 6 pp. 189–200 (1973).

R. Duda and P. Hart. "Pattern Classification and Scene Analysis. "*Clustering Criteria (K–Mean)*: John Wiley & Sons Chap. 6 pp. 217–219 (1973).

R. Duda and P. Hart. "Pattern Classificationa nd Scene Analysis." *Iterative Optimization.* (relates to K–Mean/EM) John Wiley & Sons Chap. 6 pp. 225–228 (1973).

K. Fukunaga. "Statistical Pattern Recognition". *Bayes Theorem Academic Press Chap. 1* pp. 12–13 (1990).

K. Fukanaga. "Statistical Pattern Recognition."*Normal Distributions*. Academic Press. Chap. 2 pp. 16–24 (1990).

K. Fukanaga. "Statistical Pattern Recognition." *Clustering* Academic Press. Chap. 11 pp. 508–512 (1990).

R. Duda and P. Hart. "Pattern Classification and Scene Analysis." *Nearest Mean Reclassification Algorithm (k–Mean)*: Chap. 11 pp. 515–523. Academic Press. (1990).

K. Fukanaga. "Statistical Pattern Recognition". *Maximum Likelihood*. Academic Press Chap. 11 pp. 527–532 (1990).

S. Agarwal et al., "On the Computation of Multidimensional Aggregates", Proc. 22nd Int. VLDB Conf., Mumbai (Bombay), 1996.

J. Banfield, A. Raftery, "Model–based Gausian and Non–Gausian Clustering", Biometrics, vol. 49:803–821, 1993.

D. Barbara, M. Sullivan, "A Space Efficient way to support Approximate Multidimensional Databases", George Mason University Technical Report ISSE–TR–98–03, 1998.

K.S. Beyer, R. Ramakrishnan, "Bottom–Up Computation of Sparse Iceberge Cubes", Proc. ACM SIGMOD Conf., Philadelphia, 1999 (to appear).

P.S. Bradley et al., "Clustering via Concave Minimization", Advances in Neural Information Processing Systems 9, MIT Press, 1997.

P.S. Bradley et al., "Scaling Clustering Algorithms to Large Databases", Proc. 4th Intl. Conf. On Knowlege Discovery and Data Mining (KDD98), AAAI Press, 1998.

P.S. Bradley et al., "Scaling EM Clustering to Large Databases", Microsoft Research Technical Report MSR–TR–98–35, 1998.

P.M. Deshpande et al., "Caching Multidimensional Queries using Chunks", Proc. ACM SIGMOD Conf., Seattle, 1998.

D. Fisher, "Knowledge Via Incremental Conceptual Clustering", Machine Learning, 2:139–172, 1987.

J. Gray et al., "Data Cube: A Relational Aggregation Operator Generalizing Groupiby, Cross–Tab and Sub–Totals", Data Mining and Knowledge Discovery, 1(1), pp 29–53, 1997.

H. Gupta et al., "Index Selection for OLAP", Proc. Intl. Conf. On Data Engineering, Birmingham, UK, Apr. 1997.

V. Harinarayan et al., "Implementing Data Cubes Efficiently", Proc. ACM SIGMOD Conf., Monteal, 1996.

R. Kohavi, "Scaling up the Accuracy of Naive–Bayes Classifiers: a Decision Tree Hybrid." Proc. Of the 2nd International Conf. On Knowledge Discovery and Data Mining., AAAI Press, 1996.

Y. Kotidis, N. Rousopoulos, "An Alternative Storage Organization for ROLAP Aggregate Views Based On Cubetrees", Proc., ACM SIGMOD Conf., Seattle, 1998.

I. Mumick et al., "Maintainance of Data Cubes and Summary Tables in a Warehouse", Proc. ACM SIGMOD Conf., Tuscon, 1997.

V. Poosala, Y.E. Ionnidis, "Selectivity Estimation without the Attribute Value Independence Assumption", Proc. 23rd VLDB Conf., Athens Greece, 1997.

S.Z. Selim, M.A. Ismail, "K–Means Type Algorithms: A Generalized Convergence Theorem and and Characterization of Local Optimality", IEEE Trans. Pattern Analysis and Machine Intelligence, vol. PAMI–6, No. 1, 1984.

A. Shulka et al., "Storage Estimation for Multidimensional Aggregates in the Presence of Hierachies", Proc. 22nd Int. VLDB Conf., Mumbai (Bombay), 1996.

J.S. Vitter et al., "Data Cube Approximation and Histograms via Wavelets", Proc. 7th Intl. Conf. Information and Knowledge Management (CIKM 98), Washington DC, Nov. 1998.

T. Zhang, "BIRCH: An Efficient Data Clustering Method for Very Large databases", Proc. ACM SIGMOD Conf. Montreal, 1996.

Y. Zhao et al., "An Array–Based Algorithm for Silmulntaneous Multidimensional Aggregates", Proc. ACM SIGMOD Conf., Tuscon, 1997.

Y. Zhao et al., "Silmulntaneous Optimization and Evaluation of Multiple Dimensional Queries", Proc. ACM SIGMOD Conf., Seattle, 1998.

* cited by examiner

MULTI-DIMENSIONAL DATABASE AND DATA CUBE COMPRESSION FOR AGGREGATE QUERY SUPPORT ON NUMERIC DIMENSIONS

FIELD OF THE INVENTION

The present invention concerns the compression of large database and their corresponding OLAP data cubes and provides an improved method and apparatus for efficiently and approximately answering queries based on the data contained in large databases.

BACKGROUND ART

A database management system (DBMS) stores data and retrieves it based on a data access language, typically SQL (Structured Query Language). One major use of database technology is to help individuals and organizations obtain fast/flexible reports on performance of a business. Another major use of DBMS is to support decision making based on the data contained in the database.

An important aid to the users making decisions based on data in the database is the ability to generate reports based on aggregates. Database systems support many such applications. For example, in a payroll application, the data could be represented with three attributes such as salary, years of employment and vested dollar amounts in a company pension plan. With this view of the data, it is easy to ask queries such as a query that finds the average number of years of employment of employees who have a salary greater than 100,000 dollars. Alternatively, it might be desirable to specify a range of years of employment and ask for the total contribution in dollars for people falling in that range. A desirable view of the data in a database is to provide a multidimensional view. In this case, attributes are treated as dimensions, and cells inside the cube represent all possible combinations of attribute values, along with associated aggregation measures (such as count, sum, and so forth). Further, users can specify ranges in different dimensions if they need to view data in more detail. Thus, in the above example, users could ask for the average salary of employees who have more than 100,000 dollars in vested company benefits and who have worked for the company for less than 5 years. Other applications that benefit from the multidimensional view of data include inventory control, sales and marketing, user, or customer databases.

Relational database systems can take a long time in computing the answers to such aggregation queries. The multidimensional approach pre-computes and caches many of the answers in advance and hence supports fast response times for aggregation queries. Unfortunately, in today's datacube technology, it is not possible to allow dimensions that are numeric. The reason for this is that the number of cells in a cube is determined by the number of combinations of values on all dimensions. Numeric (or continuous) dimensions have a large number of values. Hence a cube would have too have many cells. One of the emerging applications of databases is online analytical processing (OLAP) which enables users to ask decision support queries in a more natural and efficient manner than SQL-based database systems. A commonly used approach for queries that use OLAP is the so-called data cube approach which views the data records stored in the database as points in a multidimensional space. Users ask queries using the data cube approach by specifying in the query the dimensions or record attributes of interest and ranges for those dimensions.

One commonly asked OLAP query is a count query that determines the number of data records falling within a selected range. A second common query is the aggregate query which totals the values for the records falling within a selected range. By adding or deleting a dimension to a query a user can drill down or roll up over the multi-dimensional space of the database.

Transact-SQL (T-SQL) is a superset of standard SQL and forms part of SQL server version 6.5, a product of Microsoft Corporation, assignee of the present invention. Transact SQL provides two special operators, CUBE and ROLLUP, that allow multidimensional analysis to be projected by the database server where the analysis can be optimized as part of the execution plan of the query. A discussion of the CUBE and ROLLUP operators is found in the book "Inside SQL Server 6.5" by Soukup, Copyright 1997, Microsoft Press, pp 326–340 which is incorporated herein by reference. The intent of CUBE operator is to pre-compute all aggregations on all possible combinations of values. Hence the result of a cube query can be huge, in fact much larger than the data itself.

As data warehousing becomes more popular, OLAP is gaining in importance as a primary interface to evaluating data contained in the data warehouse. Most successful data mining applications include reporting systems having fast query response mechanisms. Most corporations require decision support and would benefit from improved technology to help in making decisions based upon rapidly gathered and organized data.

Specific applications include marketing aided by querying past sales data, inventory management based on querying the inventory database, hierarchical visualization of employee data and many other decision support applications. The applications of OLAP are not limited to large organizations. The concept of the data cube could be viewed as a hierarchical organization of data in general and this could be an easily understood interface that provides summarized and organized access to large volumes of data to every type of user.

One goal of a database management system is efficient support for queries on data cubes. The prior art has (a) dealt with providing exact answers to queries, (b) dealt mainly with discrete valued dimensions, and (c) treated the dimension on which the aggregation or average is performed as a dimension that is distinct from the dimensions of the data cube. Because prior art techniques concentrated on providing exact answers, the amount of data that was stored was large and expensive disk accesses were required, thus making query processing expensive. Not being able to efficiently pose queries on continuous valued dimensions limits the types of applications and the scope of data cubes. Treating all dimensions symmetrically and allowing aggregation on every dimension is not possible with such prior art systems.

Being able to query the data presented in the multidimensional format and quickly obtain the result is crucial to the effective usage of a data cube. Typically, answers to the queries on the data cube are not required with perfect accuracy and users are willing to trade off accuracy for rapid answers to these queries. This is especially true during the creation of a new report or cube. Results can always be made exact later as the report is finalized. For exploratory analysis over large stores, approximate results (as long as they are fairly accurate) are acceptable since the analyst is typically looking for rough relations (e.g. the number of employees in this category is 3 times that in another, and about the same as in yet a third category).

SUMMARY OF THE INVENTION

The present invention enables the effective summarization of large amounts of data and provides rapid answers to decision support queries on data cubes. The data is compressed by dramatic factors, and can be three to four orders of magnitude smaller than the original data size. A principal feature of the invention is the recognition that data can be viewed as points in a multidimensional space and hence can be effectively summarized using clustering techniques. Unlike prior art multi-dimensional cubes or OLAP systems which have large storage requirements, the invention takes advantage of the fact that in a typical database, many "ranges" of the range query are empty. Furthermore, the data may be concentrated in only certain dense regions (subspaces) of the original space. Hence, data compression by means of clustering provides a fairly accurate characterization of the database that is not wasteful of computer memory.

Practice of the present invention takes advantage of clustering information that can be stored on a computer performing the query analysis. The computer need not have access to the database which conceivably could include millions or more of data records. This typically results in a tremendous savings in storage requirements since the cluster-based statistical data models are typically far more compact than the number of data points that make up the database. Also, the cluster-based statistical models can typically fit in the computer's rapid access or main memory and this allows faster answers to queries even if the queries are directed to very large databases. Data points that do not fit well within any of the clusters can be retained as individual records when evaluating the queries.

One exemplary process for practicing the invention includes the steps of clustering data records contained in a database to provide a functional representation of the data for each of a multiple number of data records that make up the database. Ranges are chosen over the dimensions of the data for determining a sum or a count of data records from the database falling within the ranges. The sum or count is determined by integrating the functional representation from each cluster over the ranges to determine the sum or the count of data records from the database that fall within the selected ranges.

A computer used to practice an exemplary embodiment of the invention executes a stored program having a clustering component having a clustering model that includes a functional representation of data clustering of the database. A query execution component performs aggregation queries including sum, count and average determinations. The computer can use either the actual data records in the database (by scanning the database) to answer such queries or can use the clustering model. The computer can be a server and may provide the clustering model to network clients. The size of the clustering model is small enough that the model can be loaded into the client and used to answer queries without being connected to the server.

The invention has several important implications for database queries: (a) a traditional prior art data cube scheme expends many data cells on portions of the mutlidimensional data space that are empty or nearly empty. The invention exploits the fact that data typically resides in a much smaller subspace than the full region bounded by the database dimensions; (b) the data clusters identify subspaces of the entire database where the multiple dimensions may be interrelated and hence can be compressed via the data clustering; and (c) decision support and preliminary reporting or exploration may not require exact answers and the approximate results achieved through practice of the invention will suffice.

These and other objects, advantages, and features of the invention are further discussed in the detailed description of an exemplary embodiment of the invention which is described in conjunction with the accompanying drawings.

DETAILED DESCRIPTION OF AN EXEMPLARY EMBODIMENT OF THE INVENTION

Figure 2:
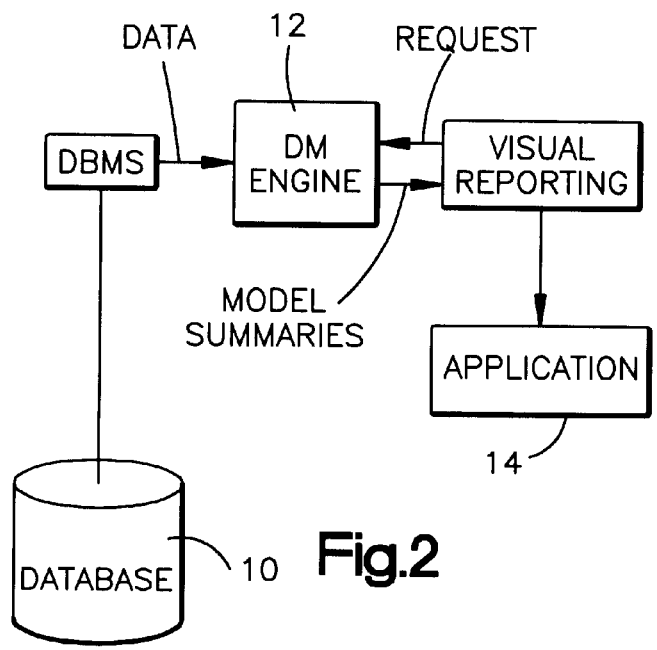
FIG. 2 is a block diagram of components constructed in accordance with an exemplary embodiment of the invention for querying data stored in a database.

The present invention has particular utility for evaluating data contained in a database 10 (FIG. 2) having many records stored on multiple, possibly distributed storage devices. Each record in the database 10 has many attributes or fields which for a representative database might include age, income, number of years of employment, vested pension benefits etc. Data of this type (e.g. U.S. Census) can contain many millions of data records and a exact query analysis is costly in terms of time and memory.

A significant observation is that if the data density of the database is known, then multi-dimensional aggregate queries can be answered without accessing the data itself. Several advantages result in executing a query using a density function rather than accessing the data. If the density function is compact, significant storage is saved as the actual data is not used in answering queries. If an integration over the density function is efficient, then executing queries using this density function is efficient. The same density function is used to answer many different aggregate queries (i.e. any dimension can also be a measure in OLAP terminology), without paying an added cost, leading to a further savings in space over traditional pre-computation approaches in OLAP. Finally, the invention admits dimensions that are numeric; something OLAP systems of today do not permit. Thus, a density-based approach addresses the limitations of existing pre-computational techniques. An exemplary embodiment of the invention employs data clustering techniques to derive a density estimation.

A data clustering model is produced by a computer 20 (FIG. 1) executing a stored computer program that implements a data mining engine or component 12. The clustering model derived from the database 10 is used for answering queries about the data records in the database.

Figure 5:
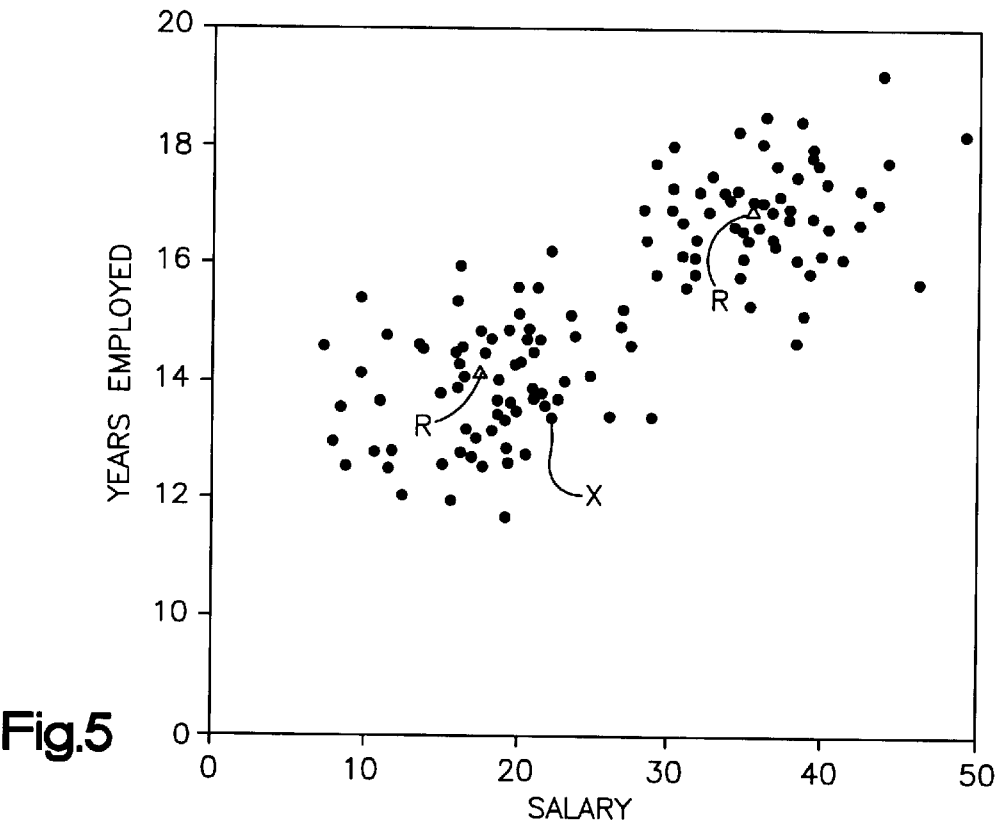
FIG. 5 is a two dimensional depiction showing a distribution of data records from a database.

FIG. 5 is a two dimensional depiction of data points extracted from the database 10. Such a depiction could be derived from a database having records of dimension n having a format of Table 1:

TABLE 1

| EmployeeID | Age | Salary | Years Employed | Vested Pension | n-4 other attributes |
|---|---|---|---|---|---|
| XXX-XX-XXXX | 46 | 39K | 12 | 100K | ... |
| YYY-YY-YYYY | 40 | 29K | 4 | 0K | ... |
| QQQ-QQ-QQQQ | 57 | 18K | 23 | 250K | ... |

The two dimensions that are plotted in FIG. 5 are years of employment (vertical axis) and salary in thousands of dollars (horizontal axis). One can visually determine that the data in FIG. 5 is lumped or clustered together into two clusters.

Data is generally not uniformly distributed and some combinations of attribute values are more likely than others (in fact some combinations never occur—e.g. low experience and very high salary). Clustering can be viewed as identifying the dense regions of the probability density of the data source. An efficient representation of the probability density function is the mixture model: a model consisting of several components (e.g. a model consisting of the sum of 3 Gaussians). Each component generates a set of data records (a "cluster"). The data set is then a mixture of clusters and the problem is to identify the data points constituting a cluster and to infer the properties of the distribution governing each cluster.

The mixture model probability density function has the form:

$$Pr(x) = \sum_{l=1}^{k} W_l Pr(x|l).$$

The coefficients $W_l$ (mixture weights) represent the fraction of the database represented by the corresponding cluster and k is the number of clusters. We focus on models whose components (clusters) are represented by multivariate Gaussians. This choice in motivated by the following result. Any distribution can be approximated accurately with a mixture model containing a sufficient number of Gaussian components. Data clustering is suitable because clusters are represented by multivariate Gaussians which are compact to represent and easy to integrate with numerical methods. Recent efficient methods for clustering large volumes of data have been developed, which enable us to perform this clustering efficiently over large databases (see patent applications to Fayyad et al).

In a so-called K-means clustering technique, the data points belong or are assigned to a single cluster. K-means clustering is described in copending U.S. patent application entitled "A scalable method for K-means clustering of large Databases" filed in the United States Patent and Trademark Office on Mar. 17, 1998 under application Ser. No. 09/042,540 (now U.S. Pat. No. 6,012,058) and which is assigned to the assignee of the present application and is also incorporated herein by reference.

A second clustering process suitable for use with the present invention uses a so-called Expectation-Maximization (EM) clustering. E-M clustering is described in an article entitled "Maximum likelihood from incomplete data via the EM algorithm", Journal of the Royal Statistical Society B, vol 39, pp. 1–38 (1977). The EM process estimates the parameters of a model iteratively, starting from an initial estimate. Each iteration consists of an Expectation step, which finds a distribution for unobserved data (the cluster labels), given the known values for the observed data. Co-pending patent application entitled "A Scalable System for Expectation Maximization Clustering of Large Databases" filed May 22, 1998 under application Ser. No. 09/083,906 (now U.S. Pat. No. 6,263,337) describes an E-M clustering procedure. This application is assigned to the assignee of the present invention and the disclosure of this patent application is incorporated herein by reference.

In an expectation maximization (EM) clustering analysis, rather than harshly assigning each data point in FIG. 5 to a cluster and then calculating the mean or average of that cluster, each data point has a probability or weighting factor that describes its degree of membership in each of the K clusters that characterize the data. For the EM analysis used in conjunction with an exemplary embodiment of the present invention, one associates a Gaussian distribution of data about the centroid of each of the two clusters in FIG. 5.

Figure 6:
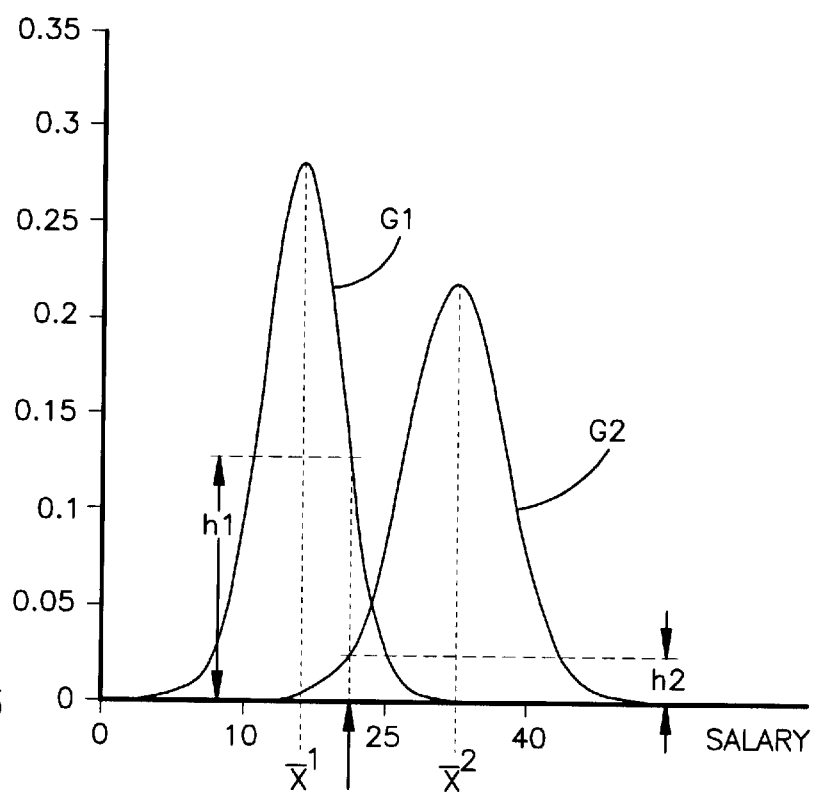
FIG. 6 is a one dimension plot showing a data distribution of data records for two data clusters.

Consider the one dimensional depiction shown in FIG. 6. The two Gaussians G1, G2 represent two clusters that have centroids or means $\overline{x}^1$, $\overline{x}^2$ in the salary attribute of 16K and 33K per year. The compactness of the data within a cluster is generally indicated by the shape of the Gaussian (variance in one dimension, or covariance matrix in multiple dimensions) and the average value of the data points that make up the cluster is given by the mean or centroid. Consider the data point identified on the salary axis of FIG. 6 as the point "X" of a data record having a salary of $22,000. This data point is plotted in the FIG. 5 depiction. The data point 'belongs' to both the clusters identified by the Gaussians G1, G2. This data point 'belongs' to the Gaussian G2 with a weighting factor proportional to h2 (probability density value) that is given by the vertical distance from the horizontal axis of FIG. 6 to the curve G2. This same data point X 'belongs' to the cluster characterized by the Gaussian G1 with a weighting factor proportional to h1 given by the vertical distance from the horizontal axis to the Gaussian G1. We say that the data point X belongs fractionally to both clusters. The weighting factor of its membership to G1 is given by h1/(h1+h2+Hrest); similarly it belongs to G2 with weight h2/(h1+h2+Hrest). Hrest is the sum of the heights of the curves for all other clusters (Gaussians). If the height in other clusters is negligible one can think of a "fraction" of the case belonging to cluster 1 (represented by G1) while the rest belongs to cluster 2 (represented by G2). For example, if h1=0.13 and h2=0.03, then 0.13/(0.13+0.03)=0.8 of the record belongs to cluster 1, while 0.2 of it belongs to cluster 2.

The invention disclosed in the above referenced two co-pending patent applications to Fayyad et al brings data from the database 10 into a computer memory 22 (FIG. 1) and the data mining engine 12 implemented by software running on the computer 20 creates an output model from that data. In a client/server implementation, an application program 14 acts as a client and the data mining engine component 12 as a server. The application program 14 is the recipient of an output clustering model. The clustering model provided by the data mining engine will typically fit in the memory of a personal computer. This will allow the data mining engine 12 to perform the clustering analysis and then transmit this model to a portable (laptop) computer so that the user needing to answer queries based on the data in the database 10 can have access to database summarizations without need to be in communication with the server. We note here that the clustering model need not be obtained from the EM or from a specific clustering algorithm. This invention simply assumes as input a model of the data consisting of a set of clusters, each of which is represented by a Gaussian distribution over the fields in the data constituting the cluster. The model may even be constructed manually if appropriate.

Probability Function

Figure 4A:
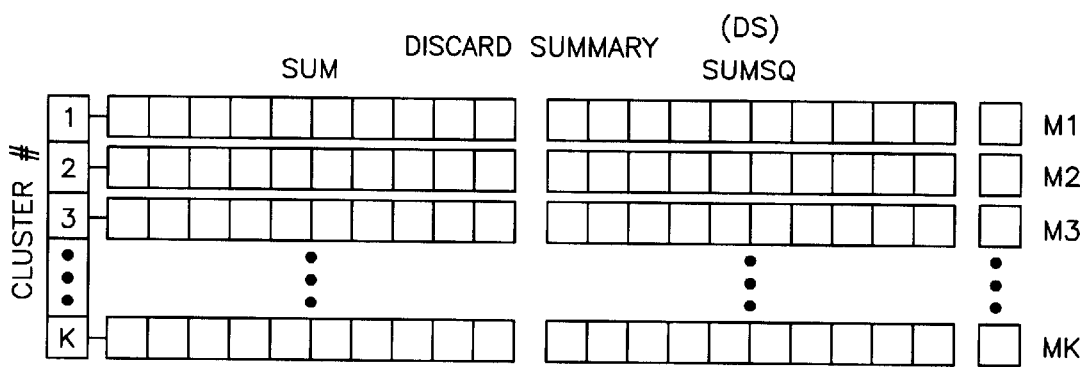
FIGS. 4A–4D illustrate a data structure for storing a clustering model that forms an output of the clustering process depicted in FIG. 3.
Figure 4B:
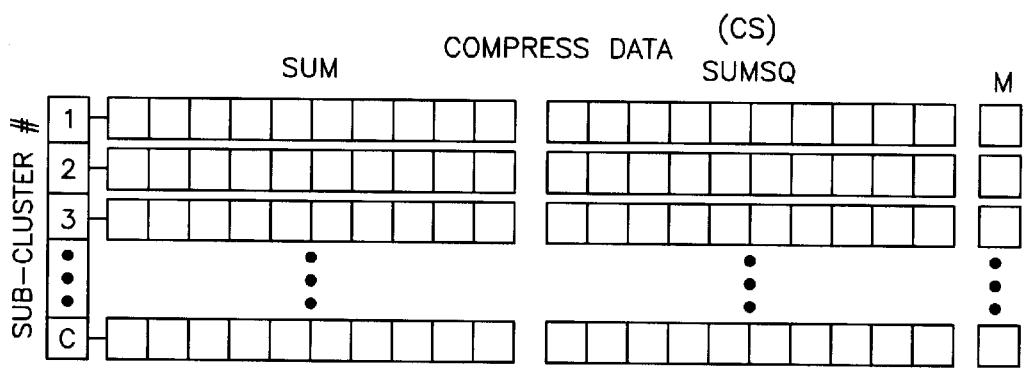
Figure 4C:
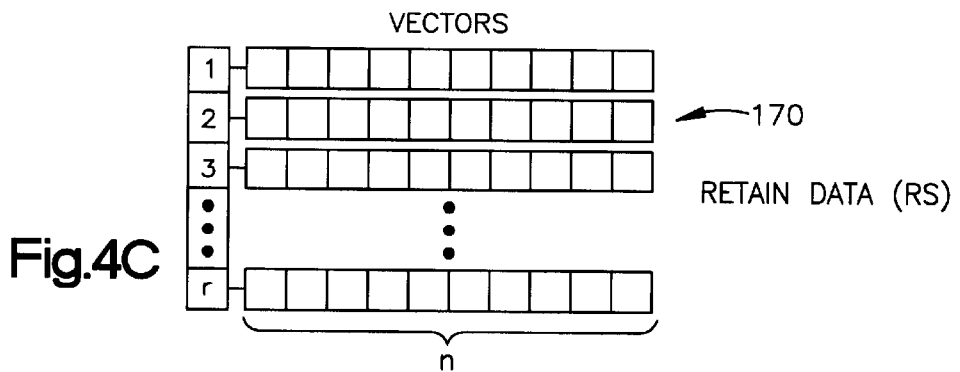
Figure 4D:
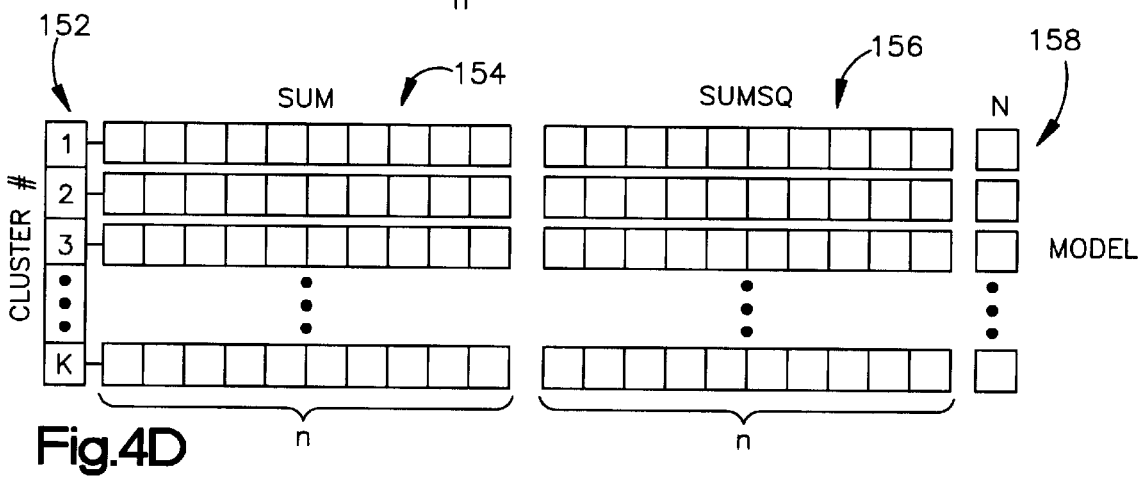

Each cluster in the model is represented or summarized as a multivariate Gaussian having a probability density function:

$$p(x) = \frac{1}{(2\pi)^{n/2}\sqrt{|\Sigma|}} e^{(-1/2(x-\mu)^T \Sigma^{-1}(x-\mu))}$$

where $x=(x_1,x_2,x_3,x_4, \ldots ,x_n)$ is a n-component column matrix corresponding to a data point in the selected n dimensional space of the database, $\mu$ is the n-component column matrix corresponding to a data structure 154 having the means (averages) of the data belonging to the cluster in each of the n dimensions (designated SUM in FIG. 4D). Sigma ($\Sigma$) is an n-by-n covariance matrix that relates how the values of attributes in one dimension are related to the values of attributes in other dimensions for the points belonging to the cluster. The transpose of a matrix $\Sigma$ is represented by $\Sigma^1$, and the inverse of a matrix $\Sigma$ is represented by $\Sigma^{-1}$. The determinant of a matrix $\Sigma$ is represented by $|\Sigma|$. The covariance matrix is always symmetric.

The number of memory locations or values required to represent each cluster in the cluster model of FIG. 4D is the sum of the following quantities: the number N (one number) indicating the data records summarized in a given cluster. (In K means this is an interger in E-M clustering a floating point number) The dimension n equals the number of items in the SUM data structure (FIG. 4D) and the value n*(n+1)/2 values for the covariance matrix $\Sigma$ which give a total of 1+n+[n*(n+1)]/2 values in all. If the covariance matrix $\Sigma$ is diagonal (FIG. 4D for example), then there are n numbers in the covariance matrix (SUMSQ in FIG. 4D) and the number of values needed to characterize the cluster is reduced to 1+2n. If there are K clusters, the memory required for the model is K(1+2n).

Figure 3:
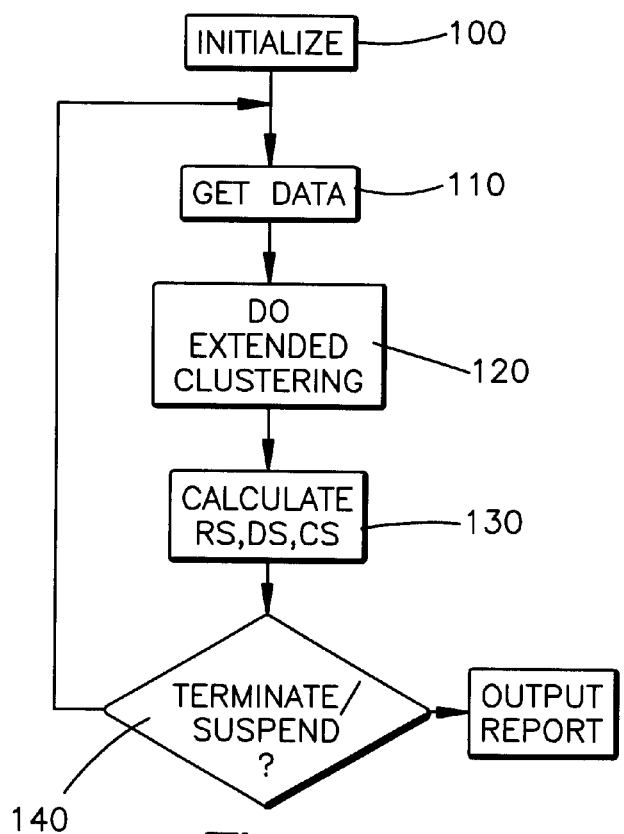
FIG. 3 is a flow chart of a clustering process used in conjunction with an exemplary embodiment of the invention.

FIG. 3 is a flow chart of the process steps performed during a scalable EM analysis of data. It is emphasized that the clustering processes disclosed in the two aforementioned patent applications to Fayyad et al need not be used in practicing the present invention, but that they are representative of suitable clustering processes that are used for clustering large databases having so many records that the memory for storing the records far exceeds the available rapid access memory of a computer that implements the data mining engine 12 for performing the clustering.

Scalable EM Clustering

A first step of the FIG. 3 scalable clustering procedure is an initialization step 100. This step sets up a number of data structures shown in FIGS. 4A–4D. At a step 110 a data sample is brought into a rapid access memory (into RAM for example, although other forms of rapid access memory are contemplated) of the computer 20 schematically depicted in FIG. 1. In general, the data has a large number of fields so that instead of a single dimension analysis, the clustering characterizes a large number of vectors where the dimension of the vector is the number of attributes of the data records in the database. A data structure for this data is shown in FIG. 6C to include a number r of records having a potentially large number of attributes D.

A processor unit 21 of the computer 20 next performs 120 an extended EM analysis of the data in memory. The term 'extended' is used to distinguish the disclosed process from a prior art EM clustering analysis. Classical (prior art) EM clustering operates on data records. This implementation works over a mix of data records (FIG. 4C) and sufficient statistics representing sets of data records (FIGS. 4A and 4B). The processor 21 evaluates the data brought into memory and iteratively determines a model of that data for each of the K clusters. A data structure for the results or output model of the extended EM analysis is depicted in FIG. 4D.

In the next step 130 in the FIG. 4 flowchart some of the data used in the present iteration to characterize the K clusters is summarized and compressed. This summarization is contained in the data structures 160, 165 of FIGS. 6A and 6B which take up significantly less storage in memory 25 than the vector data structure 170 needed to store individual records. Storing a summarization of the data in the data structures of FIGS. 6B and 6C frees up more memory allowing additional data to be sampled from the database 10. Additional iterations of the extended EM analysis are performed on this data.

Before looping back to get more data the processor 21 determines 140 whether a stopping criteria has been reached. One stopping criterion that is used is whether the EM analysis is good enough by a standard determined by the user. A second alternative stopping criterion has been reached if all the data in the database has been used in the EM analysis.

The clustering model that is produced by the process depicted in FIG. 4D is characterized by an array of pointers, one each for the K clusters of the EM model. Each pointer points to a vector 154 summarizing a mean for each dimension of the data and a second vector 156 indicating the spread of the data. As the EM model is calculated, some of the recently acquired data that was used to determine the model is compressed. All the data used to model the database is then stored in one of three data subsets. A retained data set 170 is kept in memory 22 for further use in performing the EM analysis. A discarded data set (DS) and a compressed data set (CS) are summarized in the form of sufficient statistics. The sufficient statistics are retained in memory. Regardless of the stopping criteria used to terminate the clustering process of FIG. 3, the model summary of FIG. 4D can be used to perform query analysis.

Answering Queries

Let the n dimensions in the data cube be labeled $d_1-d_n$. Also, let the number of clusters be K and let $p_1(x)$ by the Gaussian for cluster 1 and $N_1$ be the number of data points in cluster 1. We now consider the three types of queries that are common in decision support applications.

Type 1 Query (ad hoc count queries)

The first type of query specifies ranges in dimensions $d_{i1}$ through $d_{im}$, (m<n, i.e. a subset of the n dimensions), the ranges being from $a_r$ to $b_r$ for dimension $d_{ir}$ and asks for the number (count) of data items present in the range. Let the unspecified dimensions be represented as $d_{j1}$ through $d_{jn-m}$. In this case the answer is computed as the sum of the following quantity for each cluster 1.

$$\text{Num}(l) = $$

$$N_l \times \int_{-\infty}^{\infty} \ldots \int_{-\infty}^{\infty} \int_{al}^{bl} \ldots \int_{am}^{bm} p_l(x) dx_{im} \ldots dx_{il} dx_{ji} \ldots dx_{jn-m}$$

Figure 7:
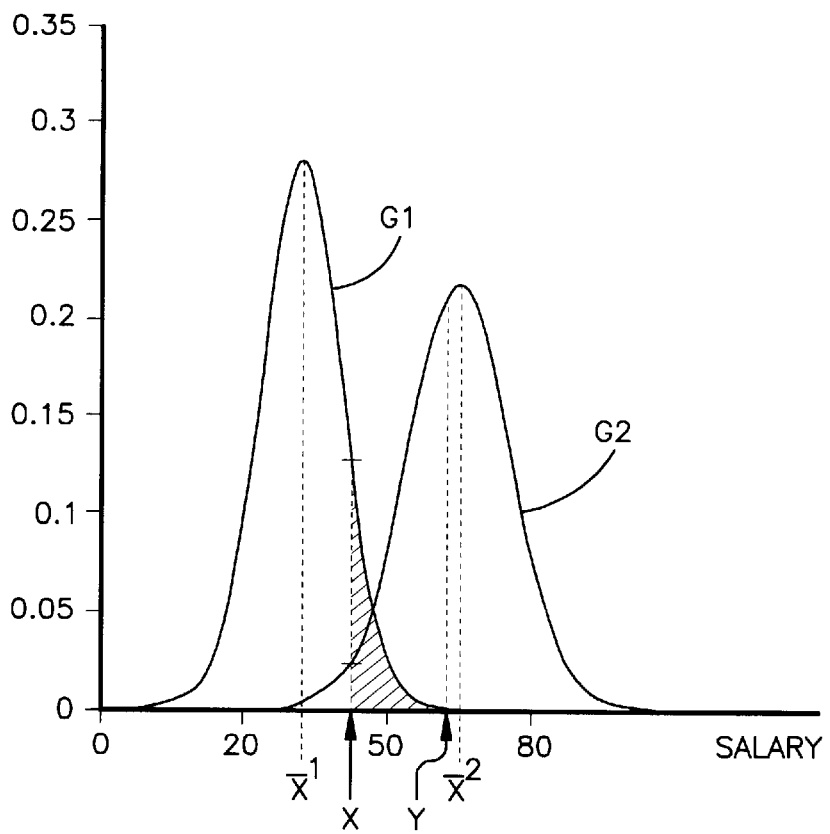
FIGS. 7 and 8 are one dimensional depictions illustrating use of a cluster model for answering queries.
Figure 8:
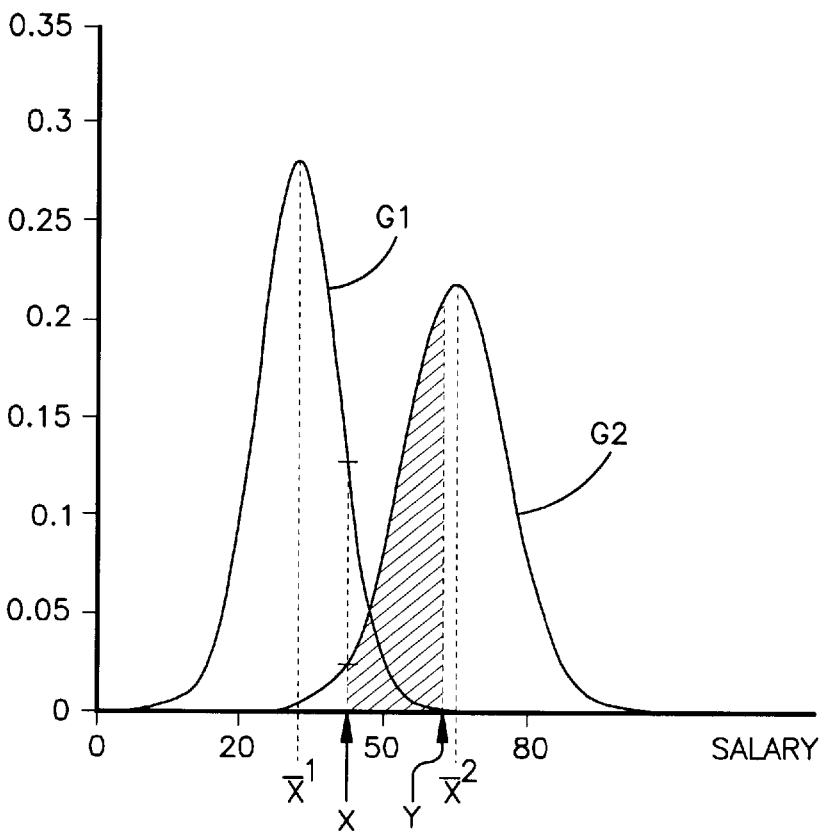

Now consider the one dimensional example of FIGS. 7 and 8. These figures are similar to FIG. 6. They depict two data clusters represented by the two Gaussian data distributions G1, G2. How many employees are there in the company having incomes between of between x=42K and y=58K?

The above integration is straightforward in the case of multivariate gaussians with a diagonal covariance matrix. In this case, the multivariate gaussian p(x) can be written as a product of univariate Gaussians for the dimensions of the data and the integral of the product of Guassians can be converted to a product of the integrals of the Gaussians. With these simplifying assumptions, the relation for Num(1) becomes:

$$\text{Num}(l) - N_1 \times \int_{am}^{bm} p_l(x_m) dx_{im} \times \ldots$$

$$\int_{al}^{bl} p_l(x_1) dx_{il} \times \int_{-\infty}^{\infty} p_l(x_i) dx_{ji} \ldots \times \int_{-\infty}^{\infty} p_l(x_{n-m}) dx_{jn-m}$$

Under the simplifying assumption, the integrals from − to + infinity for the dimensions not involved in the range queries evaluate to one. The remaining terms are univariate integrals over the dimensions $d_{i1}$ to $d_{im}$.

Consider the depiction of FIG. 7 which illustrates two Gaussians corresponding to two clusters over the dimension of salary. To evaluate the query of how many employees have salary in the range from 42K to 58K. These range boundaries are designated as 'x' and 'y' on FIG. 7. There is one dimension (salary) and there are two clusters. Consider the contribution from cluster one:

$$\text{Num}(1) = N1 \times \int_{42k}^{58k} G1 dx \times (otherterms)$$

The value of 'otherterms' in this integration is one so that the value of Num(1) evaluates to the number N1 for the first cluster times the integral represented by the shaded area on FIG. 8.

A similar integration is needed for the second cluster characterized by the gaussian G2. This result is:

$$\text{Num}(2) = N2 \times \int_{42k}^{58k} G2 dx \times (otherterms)$$

This is the number N2 times the integration which is the shaded area under the G2 gaussian in FIG. 11. The result of the query of the number of people is Num(1)+Num(2).

Type 2 Query (ad hoc Sum Queries)

This query specifies ranges in dimensions $d_{i1}$ through $d_{im}$, the ranges being from $a_r$ to $b_r$ for dimension $d_{ir}$ and asks for the sum of data items present in the range. Let the unspecified dimensions be represented as $d_{j1}$ through $d_{jn-m}$. The answer is computed as the sum of the following quantity for each cluster 1.

$$\text{Sum}(l) = $$

$$N_l \times \int_{-\infty}^{\infty} \ldots \int_{-\infty}^{\infty} \int_{al}^{bl} \ldots \int_{am}^{bm} x_s \times p_l(x) dx_{im} \ldots dx_{il} dx_{ji} \ldots dx_{jn-m}$$

For the one dimensional example of FIG. 7 a query of this type would be: What is the total company payroll paid by the company for employees making between 42K and 58K? The integration of this type of query is straighforward and can hence be computed easily.

Type 3 Query (ad hoc Average Queries)

The third query asks for the average of the values in dimension ds for the data items present in the range. The answer is computed as the ratio of the result of the query that sums the values in dimension $d_s$ in the specified range (query of type 2) and the result of the query that finds the number of data points in the specified range (query of type 1). This query would yield the average salary for the people whose salaries fall between 42K and 58K.

Handling Disjunctive Queries of types 1, 2, and 3

The above assumes that only one range selection is specified along each dimension. Disjunctive queries are easily transformed to sums over multiple ranges. Another common type of query is a "cross-tabulation", where multiple ranges are specified along each dimension. Thus, a query may require the number of data points for every combination of ages in the ranges 10–20, 20–30 and 30–40 and salaries in the range 50K–60K, 60K–90K and 90K–120K. Rather than evaluating all combinations (in this case, there are nine) as separate queries, integrals corresponding to sub-queries may be cached and re-used. Thus, in the current example, the integral for the age ranges 10–20, 20–30 and 30–40 would be performed exactly once for the entire query (similarly for the integration for the salary ranges).

Alternate Embodiment

The discussion thus far has included a clustering model such as the model of FIG. 4D. The clustering processes described in the Fayyad et al co-pending patent applications employ two other data structures referred to as DS and CS in FIGS. 4A and 4B. Individual records are stored in computer memory as vectors and are referred to as an RS data set (FIG. 4C). The database records in the RS dataset do not 'fit' within any of the clusters by criteria defined by the clustering process. An alternate embodiment of the invention is premised upon the availability of these supplemental data structures and does not use the model of FIG. 4D.

The data that is summarized in the data structure DS are records that are most appropriately summarized as belonging to one of the clusters. One can determine a Gaussian function g(x) for the data set DS in a manner analogous to the technique for the model since the diagonal covariance matrix entries (SUMSQ) are available for each of the K clusters. The data structure of CS contains subclusters of data that do not fit well within the clustering but are treated as subclusters, not associated with any of the K clusters. The CS sturctures also include a diagonal covariance matrix entry (SUMSQ) for each of the subclusters C within CS. This enables a function g(x) to be determined for each of the subclusters. The vector data of RS is treated as individual records and is not compressed.

Consider a range query seeking a count of the number of records in the database falling within the range. This is type 1 of the three type of queries described above. A Gaussian g(D) associated with the data structure DS is determined and the integration over the g(D) function performed to determine the cluster's contribution to the count. For the i-th cluster call the results of the integration $AD_i$. A gaussian g(C) for each of the C clusters in the subcluster data structure CS is also determined. For the j-th subcluster call the results of the integration over this gaussian $AC_j$. Note that each cluster in DS has a number $M_i$ of records corresponding to the number of records compressed in that cluster and each subcluster in CS has a number Mj of records corresponding to the number of records compressed in that subcluster. The answer to the count query is given by:

$$\text{Count} = \sum_{i=1}^{K} AD_i \times M_i + \sum_{j=1}^{C} AC_j \times M_j + |RS_A|$$

$RS_A$ is the number of items in RS fall within the bounds of the range query. The sum and average values of records within the range are computed in an analogous fashion.

Extensions

In working with the above three types of queries, we have identified two extensions to the fundamental processes described above that arise using the E-M technique outlined in FIG. 3. A first problem concerns outlier data points. These data points are points that are far away from the means of all the K clusters in at least one of the D dimensions. These data points are not accounted for by any of the clusters in the FIG. 4D model although they do contribute to that model. A second problem relates to the fact that the Gaussian characterized by the SUMSQ data structure 156 for a given cluster may not approximate an idealized Gaussian.

We propose two different techniques for dealing with outlier data. Outliers are first identified by calculating the distance of each data point from the mean of the cluster. Formally, a data point $x=(x_1, x_2, x_3, x_4 \ldots x_n)$ is an outlier if for any cluster C, there exists a dimension Di such that $(x_i-\mu_i)/\sigma_i > \tau$. $\mu_i$ and $\sigma_i$ are the means and variances for the cluster in the ith dimension respectively and $\tau$ is a constant that can be set to values greater than 2. Higher values of $\tau$ imply a stricter condition for outliers. If the number of outliers is small enough, they can be stored in memory without exceeding a specified memory limitation. Otherwise, they may spill to disk or be retained in a small database table. These outliers are stored as vector data along with the cluster information (outlier data is stored in structure RS, FIG. 4C in the E-M procedure discussed above) In this circumstance the query involves the integration over the Gaussians as well as an addition of the outlier data items.

The outliers are identified as follows. Let $l_i(p)$ denote the likelihood of a point p belonging to cluster i. Further, let $l(p)=\max_{1 \leq i \leq c}(l_i(p))$. Then the no points with the least value of l(p) are labeled the outliers. The mean and variance of the clusters that they belong to are updated to reflect the fact that they are outliers and are no longer members of those clusters.

A second approach would cluster the outliers that satisfy the above criteria and perform the above integrations over the resulting gaussians.

In the case where the data distribution within a cluster is not strictly Gaussian, we identify the regions that are more dense than the probability function of a true Gaussian would predict. This is achieved by dividing each dimension within the range of the cluster into equal width histograms. By subtracting the expected number of data points based on a normal Gaussian from the values obtained from the model, it is possible to identify regions of non-Gaussian data distribution. Once the regions of non-Gaussian data distributions are identified, the data in these regions is re-clustered and the number of clusters increased. The goal is to increase the number of clusters to achieve better gaussian distributions for the increased number of data clusters. In the above case of outliers, when the outliers are clustered they become additional (presumably Guassian) clusters that can be treated as an increased number of data clusters.

Computer System

Figure 1:
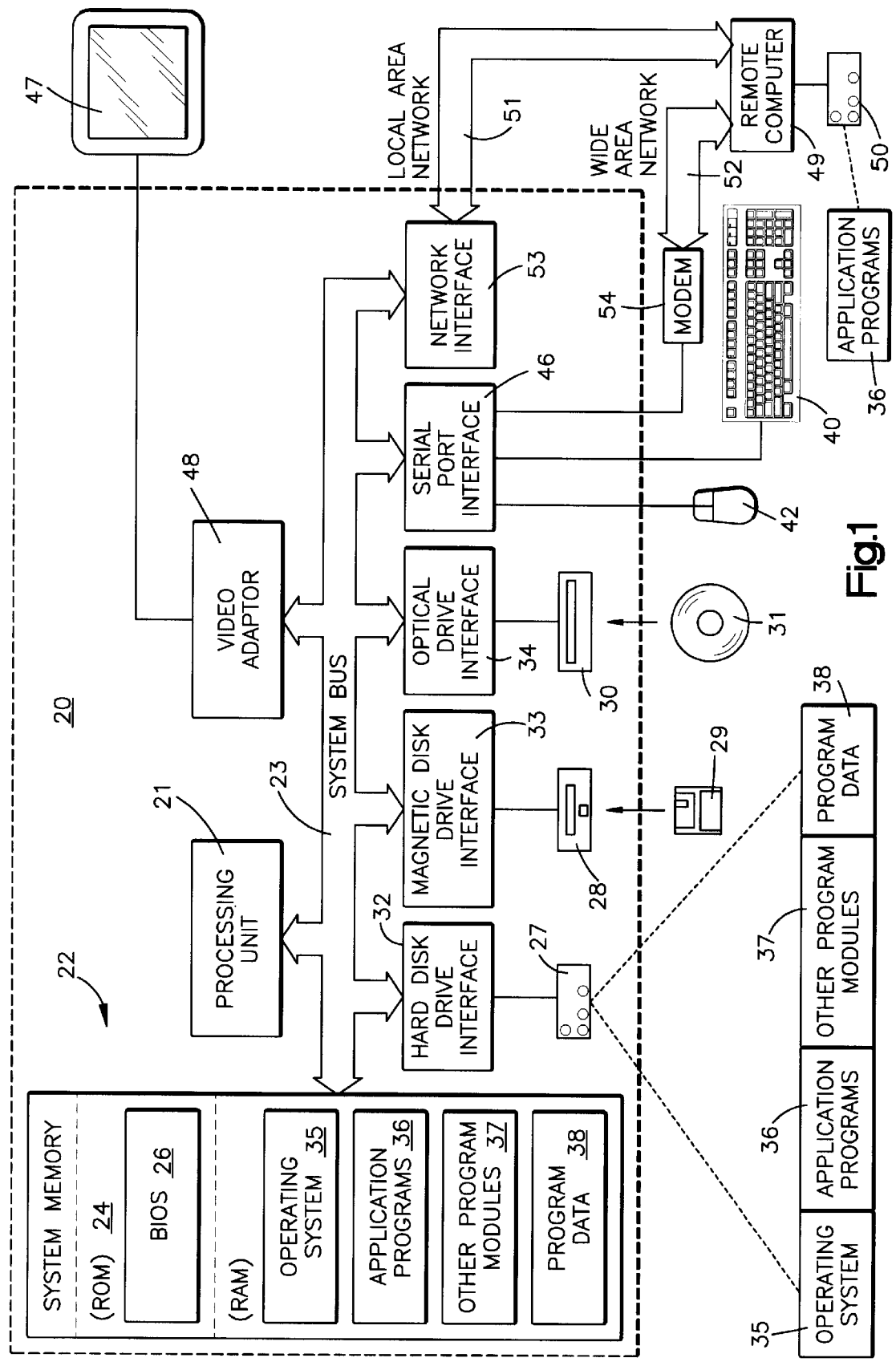
FIG. 1 is a schematic depiction of a computer system for use in practicing the invention.

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

The present invention has been described with a degree of particularity. The use of a clustering process as disclosed in the three Fayyad et al pending patent applications referenced above is optional. It is therefore appreciated that the invention is intended to include all modifications and alterations falling within the spirit of scope of the appended claims.

We claim:

1. A method of querying a database containing data records stored in the database comprising the steps of:
   a) providing a functional representation of multiple data clusters from data records stored on a database; said functional representation identifying a distribution probability of said data records;
   b) selecting ranges over dimensions of the data for determining a sum or a count of data records from the database falling within the ranges; and
   c) determining a sum or a count of data records from the database that fall within the selected ranges by integrating the functional representation over the ranges for clusters having a functional representation that includes said ranges.

2. The method of claim 1 wherein the records have one or more fields containing continuous or numeric data or fields whose distribution may be modeled with a Gaussian distribution.

3. The method of claim 2 wherein the step of determining ranges limits some but not all of the continuous fields to specific ranges and wherein the integrating step for continuous fields not so limited is over an entire range of said one or more fields.

4. The method of claim 1 additionally comprising the step of counting or summing individual data records from the database not included in the functional representation of data clustering that are treated as outliers.

5. The method of claim 1 wherein the function representation of a data clustering is derived from a covariance matrix based on the data in the database.

6. The method of claim 5 wherein the covariance matrix is an n by n matrix wherein all non-diagonal entries are zero.

7. The method of claim 1 wherein both the sum and the count are determined and their ratio determined to provide an average of the data records within the ranges.

8. The method of claim 1 additionally comprising the step of clustering data in the database to provide a clustering model from which the functional description of multiple data clusters in the database is provided.

9. The method of claim 8 wherein the step of providing the functional representation comprises the steps of computing a mean and a spread for each data dimension of the multiple clusters which form the clustering model and wherein the mean and spread are then used to calculate a functional representation for each dimension.

10. The method of claim 9 wherein the functional representation is a Gaussian based upon the mean and the spread for the dimensions of each of the multiple data clusters.

11. The method of claim 1 wherein the step of providing a functional representation excludes certain data records by identifying outlying data records as not falling within a data cluster.

12. The method of claim 11 wherein the step of determining a sum or a count total adds contributions from the outlying data records.

13. The method of claim 12 wherein the step of providing the functional representation is performed by a clustering step that results in a cluster model having a cluster number K and wherein said clustering step is performed by allocating an amount of a computer rapid access memory for storing the cluster model that includes the K clusters and an additional step of allocating an additional amount of memory for storing the outlying data records.

14. Apparatus for querying a database containing data records comprising:
   a) means for providing a functional representation of data clusters representing multiple number of data records stored on a database;
   b) means for selecting ranges over dimensions of the data for determining a sum or a count of data records from the database falling within the ranges; and
   c) means for determining the sum or the count of data records from the database that fall within the selected ranges by integrating the functional representation from each cluster over the ranges.

15. The apparatus of claim 14 wherein the means for determining determines both the sum and the count and including means for determining a ratio to find the average value of data records over the ranges.

16. Data mining apparatus for querying a database containing data records comprising:
   a) a memory device for storing a database comprising multiple data records organized into data fields having a dimension n for storing data record items;
   b) a computer having one or more processing units for executing a stored computer program, said computer including a rapid access memory store; and
   c) an interface for coupling the memory device for storing the database to the computer to allow records to be retrieved from the database; wherein
   d) said computer executing a stored program having software components including i) a component for providing a functional representation of multiple data clusters for representing multiple number of data records stored on a database; ii) a component for selecting ranges over dimensions of the data for determining a sum or a count of data records from the database falling within the ranges; and iii) a component for integrating the functional representation from each cluster over the ranges to determine the sum or the count of data records from the database that fall within the selected ranges.

17. The apparatus of claim 16 wherein execution of the stored program provides a functional representation by clustering data into a number, K of clusters, and wherein said clustering step is performed by allocating an amount of the computer's rapid access memory store for storing a cluster model.

18. The apparatus of claim 17 wherein an amount of the computer's rapid access memory store is allocated for storing outlying data records determined not to fit within any of the K clusters.

19. A method of counting data records containing continuous attributes that are stored in the database; said method comprising the steps of:
   a) defining a data cube over which to count by selecting ranges over one or more of the continuous attributes of the data records in a database;
   a) providing a functional representation of data clusters from data records stored in the database; said functional representation identifying a distribution probability of said data records; and
   c) determining the count of data records from the database that fall within the data cube by integrating the functional representation of the data clustering over the selected ranges for each of the clusters having a functional representation that includes the selected ranges.

20. The method of claim 19 additionally comprising the step of summing attribute contributions by integrating the value of the functional representation over the data cube.

21. The method of claim 20 additionally comprising the step of finding an average value of the data records falling within the data cube by taking a ratio of the sum to the count.

22. The method of claim 19 additionally comprising the step of in addition to integrating over the data cube performing a complete scan of the database and counting data records satisfying a search criteria.

23. The method of claim 19 additionally comprising a clustering step that produces a cluster model comprising a covariance matrix for each of K clusters within the clustering model.

24. The method of claim 19 wherein the functional representation comprises a mixture model probability density function of the form:

$$Pr(x) = \sum_{l=1}^{k} W_l Pr(x \mid l).$$

having mixture weights $W_l$ which represent a fraction of the database represented by a data cluster and wherein the number k is the number of such database clusters.

25. The method of claim 19 wherein the step of providing the function representation is performed by a server computer and the steps of determining the count and defining the data cube are performed on one or more client computers which may or may not be in communication with the server computer when the determining step is conducted.

26. A computer-readable medium having computer executable instructions for performing steps comprising:
   a) providing a functional representation of data clusters representing data records stored on a database; said functional representation identifying a distribution probability of said data records;
   b) selecting ranges over dimensions of the data for determining a sum or a count of data records from the database falling within the ranges; and
   c) determining a sum or a count of data records from the database that fall within the selected ranges by integrating the functional representation of the data clusters over the ranges.

27. The computer readable medium of claim 26 wherein the step of determining ranges limits some but not all of the data fields to specific ranges and wherein the integrating step for fields not so limited is performed over an entire range of said one or more fields.

28. The computer readable medium of claim 26 additionally including computer readable instructions for counting or summing individual data records from the database not included in the functional representation of data clustering.

29. The computer readable medium of claim 26 wherein the computer readable instructions cause the computer to determine both the sum and the count and further comprising computer readable instructions for determining their ratio to provide an average of the data records within the ranges.

30. The computer readable medium of claim 26 further comprising computer executable instructions for clustering data in the database to provide a clustering model from which the functional description of multiple data clusters in the database is provided.

31. The computer readable medium of claim 30 wherein the computer executable instructions provide a functional representation by computing a mean and a spread for each data dimension of the multiple clusters to form the clustering model and wherein the mean and spread are then used to calculate a functional representation for each dimension.

32. The computer readable medium of claim 26 wherein the computer executable instructions that provide a functional representation excludes certain data records by identifying outlying data records as not falling within a data cluster.

33. The computer readable medium of claim 32 wherein the instructions for determining a sum or a count total adds contributions from the outlying data records.

34. The computer readable medium of claim 33 wherein the computer executable instructions provide the functional representation by performing a clustering step that results in a cluster model having a cluster number K and wherein said clustering step is performed by allocating an amount of a computer rapid access memory for storing the cluster model that includes the K clusters and an additional step of allocating an additional amount of memory for storing the outlying data records.

35. A database management system for querying a database containing data records comprising:
   a) a memory device for storing a database comprising multiple data records organized into data fields;
   b) a computer having one or more processing units for executing a stored computer program, said computer including a rapid access memory store; and
   c) an interface for coupling the memory device for storing the database to the computer to allow records to be retrieved from the database; wherein
   d) said computer executing a stored program having software components including i) a clustering component for providing a cluster model that includes a functional representation of data clusters representing multiple number of data records stored on a database; and ii) a query execution component which performs an aggregation query comprising a sum, a count or an average computed from either the actual data stored in the database or from an integration of the available functional representation of the clusters from the clustering model of the data.

36. The database management system of claim 35 wherein the query execution component selects ranges over dimensions of the data for determining a sum or a count of data records from the database falling within the ranges; and then integrates the functional representation from each cluster of multiple clusters in the clustering model over the ranges to determine the sum or the count of data records from the database that fall within the selected ranges.

37. The database management system of claim 35 wherein the computer is a server computer that exports a compressed form of the database from the cluster model, said database management system comprising multiple client computers including client software components to compute aggregate queries without again accessing data from the server once the compressed form of the database has been communicated to said client.

38. The database management system of claim 35 the query execution component quickly computes approximate answers to the queries and displays results on a user interface of said computer prior to initiating a complete scan of the database to obtain the answer using data in its storage system.

* * * * *